United States Patent
Hsu

(10) Patent No.: US 11,636,440 B2
(45) Date of Patent: Apr. 25, 2023

(54) ELECTRONIC DYNAMIC CALENDAR SYSTEM AND OPERATION METHOD THEREOF

(71) Applicant: Kevin Ta Hsiang Hsu, New Taipei (TW)

(72) Inventor: Kevin Ta Hsiang Hsu, New Taipei (TW)

(73) Assignee: Kevin Ta Hsiang Hsu, New Taipei (TW)

( * ) Notice: Subject to any disclaimer, the term of this patent is extended or adjusted under 35 U.S.C. 154(b) by 343 days.

(21) Appl. No.: 17/132,204

(22) Filed: Dec. 23, 2020

(65) Prior Publication Data

US 2021/0192464 A1 Jun. 24, 2021

(30) Foreign Application Priority Data

Dec. 24, 2019 (TW) ................. 108147410

(51) Int. Cl.
*G06Q 10/10* (2023.01)
*G06Q 10/1093* (2023.01)
*G06F 3/0481* (2022.01)
*G06F 16/906* (2019.01)
*G06F 3/14* (2006.01)

(52) U.S. Cl.
CPC ....... *G06Q 10/1093* (2013.01); *G06F 3/0481* (2013.01); *G06F 3/14* (2013.01); *G06F 16/906* (2019.01)

(58) Field of Classification Search
CPC .......... G06Q 10/1093; G06Q 30/0243; G06Q 30/02; G06Q 30/06; G06Q 30/0244; G06F 3/0481; G06F 16/906; G06F 3/14; G06F 16/907; G06F 16/44; G06F 40/58; G06F 16/7867; G06F 16/1815; G06F 16/447; G06F 16/168; G06F 13/14; G06F 16/00; G06F 3/016; G06N 3/08; G06N 20/00; G02B 27/017; G16H 30/40; G16H 30/00; G16H 10/60; G05D 1/0016; A61K 39/39566; H04L 51/046; H04L 51/10; H04L 12/1818; H04N 21/44
See application file for complete search history.

(56) References Cited

U.S. PATENT DOCUMENTS 10,691,740 B1 *  6/2020  Anorga ................... G06F 16/44
11,430,211 B1 *  8/2022  Tiutiunnik ............. H04L 51/10
(Continued)

FOREIGN PATENT DOCUMENTS

AU    2010327453 B2 *  5/2015  ............. G06F 3/016
AU    2014288039 A1 * 11/2015  ............. G06F 13/14
(Continued)

*Primary Examiner* — Steven P Sax
(74) *Attorney, Agent, or Firm* — Amin, Turocy & Watson, LLP

(57) ABSTRACT

Provided is an electronic dynamic calendar system and an operation method thereof for providing an electronic calendar capable of importing multimedia messages such as audio, photos and video. Different from conventional electronic calendars that can only record text messages therein, the electronic calendar can have richer content. In addition to a text message, a reminder of a multimedia message can be set according to the user's need such that the reminder content set by the user can be more clearly understood and expressed.

13 Claims, 11 Drawing Sheets

(56) References Cited

U.S. PATENT DOCUMENTS

| | | | |
|---|---|---|---|
| 2006/0069998 A1* | 3/2006 | Artman | G06F 16/907 |
| | | | 707/E17.143 |
| 2009/0172035 A1* | 7/2009 | Lessing | G06Q 30/02 |
| 2013/0063550 A1* | 3/2013 | Ritchey | G05D 1/0016 |
| | | | 345/207 |
| 2013/0311528 A1* | 11/2013 | Liebermann | G06F 40/58 |
| | | | 707/899 |
| 2016/0154239 A9* | 6/2016 | Layson, Jr. | G02B 27/017 |
| | | | 345/8 |
| 2018/0083898 A1* | 3/2018 | Pham | H04L 51/046 |
| 2018/0101540 A1* | 4/2018 | Stoop | G06F 16/7867 |
| 2019/0034976 A1* | 1/2019 | Hamedi | G06Q 30/0243 |
| 2020/0150832 A1* | 5/2020 | Winn | A61K 39/39566 |
| 2020/0160985 A1* | 5/2020 | Kusuma | G16H 30/40 |
| 2021/0027065 A1* | 1/2021 | Chung | G06N 3/08 |

FOREIGN PATENT DOCUMENTS

| | | | | |
|---|---|---|---|---|
| CA | 2964397 A1 | * | 12/2005 | H04N 21/2181 |
| CA | 3094666 A1 | * | 9/2019 | A63B 21/015 |
| CA | 3066076 C | * | 7/2020 | G06F 16/00 |
| CN | 103559256 A | * | 2/2014 | G06F 16/1815 |
| JP | 2004064503 A | * | 2/2004 | G06Q 30/06 |
| JP | 2004297649 A | * | 10/2004 | |
| TW | 200926805 A | * | 6/2009 | G06F 16/168 |
| WO | WO-2005076156 A1 | * | 8/2005 | G06F 16/447 |
| WO | WO-2009027323 A2 | * | 3/2009 | H04L 12/1818 |

* cited by examiner

ELECTRONIC DYNAMIC CALENDAR SYSTEM AND OPERATION METHOD THEREOF

CROSS-REFERENCE TO RELATED APPLICATIONS

This application claims priority to Taiwan Application Serial No. 108147410, filed on Dec. 24, 2019. The entirety of the application is hereby incorporated by reference herein and made a part of this specification.

BACKGROUND

1. Technical Field

The present disclosure relates to electronic calendar technologies, and more particularly, to an electronic dynamic calendar system and an operation method thereof.

2. Description of Related Art

Calendars are indispensable for busy modern people, especially important for businessmen. Using a calendar effectively can help a businessman to work more efficiently. Generally, a conventional electronic calendar can only store text messages and set reminder times and/or dates. However, when a user uses a text message as a reminder, the user usually can only set simple content such as "remember to buy groceries after work," "take the family to see a doctor," or "remember to bring a product to the meeting." Although it is convenient to use a simple text message as a reminder, the amount of information is quite limited, which may cause the user to misunderstand or be unclear about the content.

For example, the above-described text message of "remember to bring a product to the meeting" does not include product information and may confuse the user. Although the conventional electronic calendar can add the name or specification of the product to the content of the reminder, it complicates the text message. As such, it becomes difficult for the user to effectively understand the content of the text message. Simply put, when a text message is used as a reminder, the more the content, the clearer but more complicated the message becomes. On the contrary, the less the content, the more unclear but simpler the message becomes.

In order to overcome the above-described drawbacks, the present disclosure provides an electronic dynamic calendar containing multimedia messages such as audio, photos and/or video, wherein the multimedia messages can be used independently or in combination with text messages so as to facilitate the user to more intuitively understand the meaning of the reminder content. Further, the content becomes more concise and the user efficiency is improved.

SUMMARY

In view of the above-described drawbacks, the present disclosure provides an electronic dynamic calendar system, which comprises: a display having a screen; a data transmission interface for receiving a multimedia message; and a processing unit, comprising: a calendar database having an electronic calendar with a plurality of fields, wherein each of the fields is used for accessing record information; a classification module for classifying the multimedia message received by the data transmission interface into the record information, wherein the record information is at least one object or at least one group, and wherein the at least one object is the multimedia message and the at least one group has the at least one object; a storage module for storing the record information generated by the classification module into any one of the fields of the electronic calendar; a dynamic state setting module for setting a dynamic state of the field of the electronic calendar having the record information stored therein to cause the electronic calendar to become an electronic dynamic calendar, wherein the dynamic state of the field is a thumbnail or text; and a display module for outputting the electronic dynamic calendar to the screen of the display and displaying the dynamic state of the field of the electronic dynamic calendar on the screen of the display.

The present disclosure further provides a method of electronic dynamic calendar operation, which comprises: providing, by a calendar database, an electronic calendar having a plurality of fields, wherein each of the fields is used for accessing record information; classifying, by a classification module, a multimedia message received by a data transmission interface into the record information, wherein the record information is at least one object or at least one group, and wherein the at least one object is the multimedia message and the at least one group has the at least one object; storing, by a storage module, the record information generated by the classification module into any one of the fields of the electronic calendar; setting, by a dynamic state setting module, a dynamic state of the field of the electronic calendar having the record information stored therein to cause the electronic calendar to become an electronic dynamic calendar, wherein the dynamic state of the field is a thumbnail or text; and outputting, by a display module, the electronic dynamic calendar to a screen of a display, thereby displaying the dynamic state of the field of the electronic dynamic calendar on the screen of the display.

The present disclosure further provides an electronic dynamic calendar system built in a terminal device, which comprises: a display having a screen; a data transmission interface for receiving a first video message or a first multimedia message; and a processing unit, comprising: a calendar database allowing to create a plurality of electronic calendars each having a plurality of fields, wherein each of the fields is used for accessing record information; a multimedia module for receiving a second video message or a second multimedia message obtained by the terminal device; a classification module for receiving the first video message or the first multimedia message or the second video message or the second multimedia message imported from the data transmission interface or the multimedia module and classifying the first or second multimedia message into the record information, wherein the record information is at least one object, at least one text, or at least one group; a storage module for receiving the record information generated by the classification module and storing the record information into at least one field of one of the plurality of electronic calendars; a dynamic state setting module for setting a dynamic state of the field of the electronic calendar having the record information stored therein to cause the electronic calendar to become an electronic dynamic calendar, wherein the dynamic state of the field is a thumbnail or text; and a display module for outputting the electronic dynamic calendar to the screen of the display, thereby displaying the dynamic state of the field of the electronic dynamic calendar on the screen of the display.

In an embodiment, the electronic dynamic calendar opens access to edit the at least one object or the at least one group.

In an embodiment, the classification module further classifies the multimedia message into the record information according to time, date, file format, position or a combination thereof, and the position is an address or is latitude and longitude.

In an embodiment, the classification module is further used to classify a web address into the record information, wherein the record information is the at least one object or the at least one group, the at least one object is the multimedia message or the web address, and the at least one group has the at least one object.

In an embodiment, according to time, date or a combination of time and date of the record information, the storage module stores the record information in a field of the electronic calendar having the same time, date or a combination thereof.

In an embodiment, the display module further allows to move the dynamic state of the field of the electronic dynamic calendar displayed on the screen of the display to any one of the fields of the electronic dynamic calendar displayed on the screen.

In an embodiment, after the dynamic state of the field on the screen of the display is clicked, the display module displays complete content of the record information corresponding to the clicked dynamic state of the field on the screen of the display.

In an embodiment, a login module is included for creating an electronic dynamic calendar account, logging in to the electronic dynamic calendar system with an existing electronic dynamic calendar account or logging in to the electronic dynamic calendar system with a social account.

In an embodiment, after the login module logins to the electronic dynamic calendar system with the social account, the login module synchronizes the social account, such that the multimedia message of the social account is transmitted or imported through the data transmission interface to the classification module for classification and stored by the storage module into any one of the fields of the electronic calendar of the calendar database.

In an embodiment, a search module is included for searching for the record information in any one of the fields of the electronic dynamic calendar or the dynamic state of the field by using a keyword, time, date, file format, position or a combination thereof.

In an embodiment, a reminder module is included for setting a reminder of the dynamic state of any one of the fields of the electronic dynamic calendar according to time, date or a combination thereof.

In an embodiment, a multimedia module is included for obtaining the multimedia message through an audio recording device or a photo or video capturing device of a terminal device so as for the classification module to classify the multimedia message obtained by the multimedia module into the record information.

Further, the present disclosure provides a computer readable storage medium applicable in a computer, which stores instructions for performing the above-described method of electronic dynamic calendar operation.

Therefore, the present disclosure provides an electronic calendar capable of importing multimedia messages such as audio, photos and video. Different from the conventional electronic calendars that can only record text messages therein, the electronic dynamic calendar of the present disclosure can contain record information of multimedia messages such as audio, photos and video and thus have richer content. The record information can be selected and imported to the electronic dynamic calendar by the user according to the need. In addition, the record information in any one of the fields of the electronic dynamic calendar or the dynamic state of the field can be displayed on the screen of the display.

Further, the electronic dynamic calendar of the present disclosure can open access to edit, thus allowing other people to edit the content of the calendar and set a reminder. When a reminder is due, not just text but image or sound may pop up. For example, a user can set a reminder multimedia message for a meeting and share it with other related users. As such, when the meeting message is received by the other related users, the multimedia message such as a product pattern is also displayed. Hence, the received message content becomes more intuitive and effective for the users.

DETAILED DESCRIPTION OF THE EMBODIMENTS

The following illustrative embodiments are provided to illustrate the present disclosure, these and other advantages and effects can be apparent to those in the art after reading this specification.

It should be noted that all the drawings are not intended to limit the present disclosure. Various modifications and variations can be made without departing from the spirit of the present disclosure. Further, terms such as "first," "second," "on," "a," etc., are merely for illustrative purposes and should not be construed to limit the scope of the present disclosure.

Figure 1:
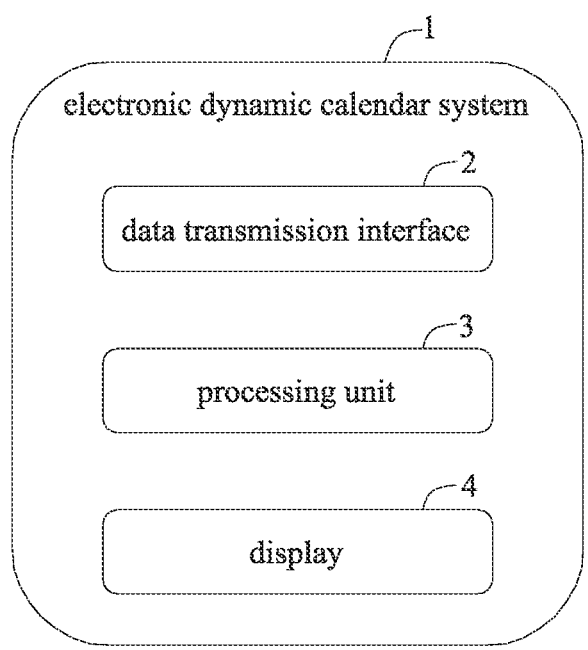
FIG. 1 is a schematic architecture diagram of an electronic dynamic calendar system according to a first embodiment of the present disclosure.
Figure 2:
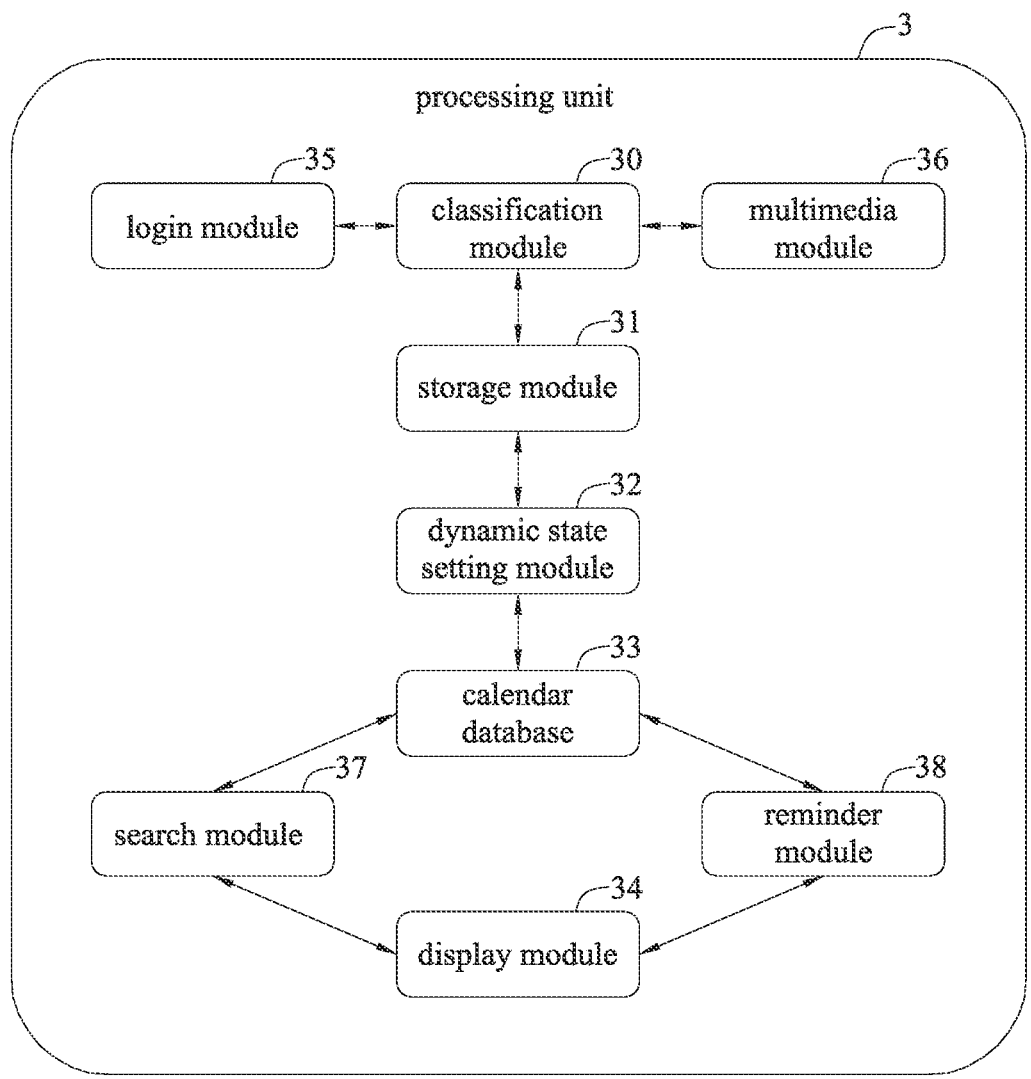
FIG. 2 is a schematic architecture diagram of a processing unit of the electronic dynamic calendar system according to the first embodiment of the present disclosure.

FIGS. 1 and 2 are schematic architecture diagrams of an electronic dynamic calendar system according to a first embodiment of the present disclosure. As shown in FIGS. 1 and 2, the electronic dynamic calendar system 1 has a data transmission interface 2, a processing unit 3 and a display 4.

The processing unit 3 has a classification module 30, a storage module 31, a dynamic state setting module 32, a calendar database 33, a display module 34, a login module 35, a multimedia module 36, a search module 37 and a reminder module 38.

Moreover, the electronic dynamic calendar system 1 is built in a terminal device (not shown) such as a smartphone, a tablet, a computer, a smart bracelet or a smart watch. The data transmission interface 2 can be, but not limited to, an application programming interface (API), universal serial bus (USB), Wi-Fi, Bluetooth, near-field communication (NFC), network (e.g., Internet, mobile network) or any data transmission interface. The processing unit 3 can be, but not limited to, a unit having a processor, a memory, a storage device, a database, a cloud computing platform or a cloud server.

Further, each of the above-described modules can be a hardware such as a processing unit, processor, computer or server with data processing and computing capabilities, or can be a software or firmware that comprises instructions executable by a processing unit, processor, computer or server and installed in a same hardware device or distributed in a plurality of different hardware devices.

Figure 3A:
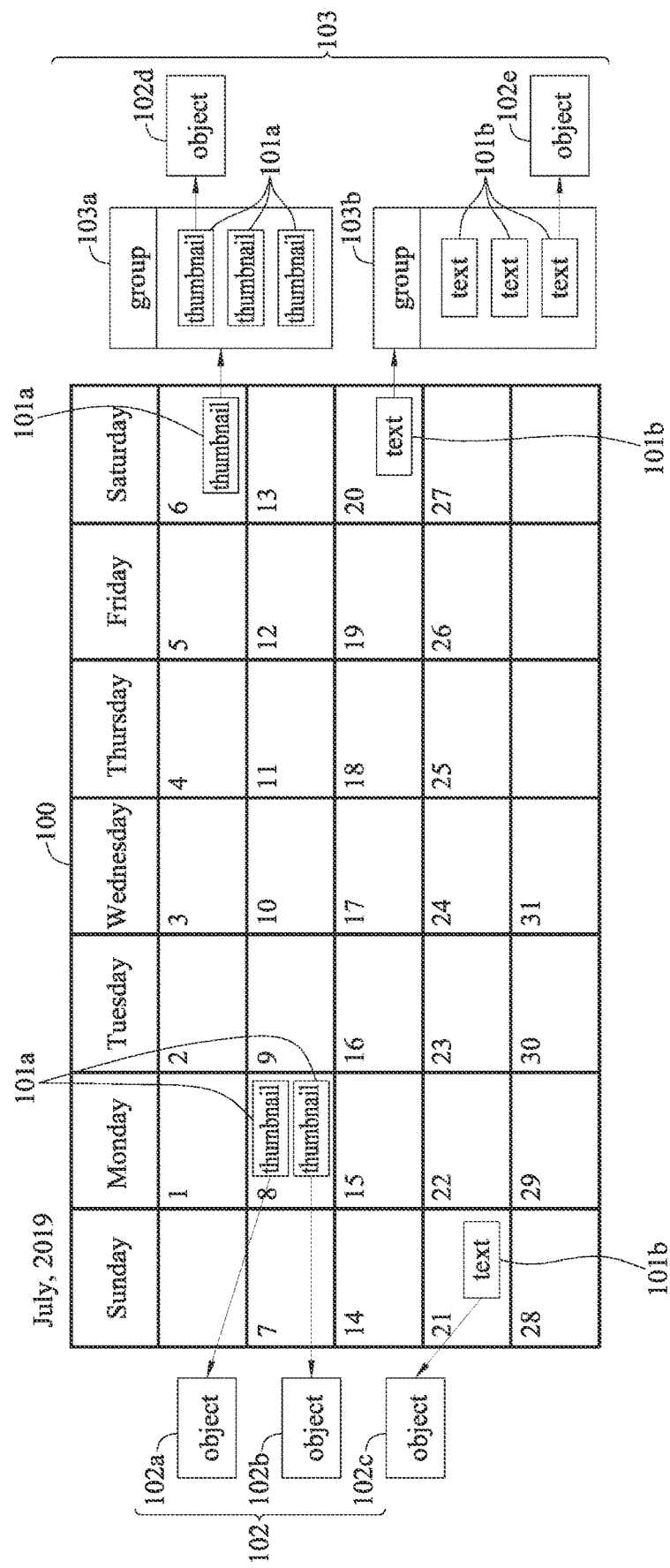
FIGS. 3A and 3B are schematic diagrams of electronic dynamic calendars according to the first embodiment of the present disclosure.
Figure 3B:
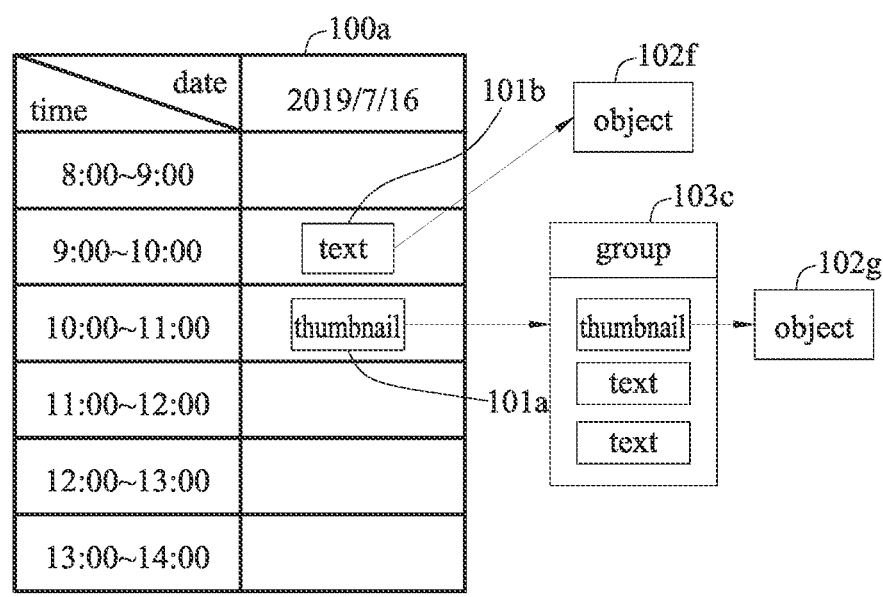

FIGS. 3A and 3B are schematic diagrams of electronic dynamic calendars according to the first embodiment of the present disclosure. As shown in FIGS. 3A and 3B, the electronic dynamic calendars 100, 100a have fields with dynamic states. For example, the dynamic state of a field is a thumbnail 101a or text 101b. The dynamic state of the field contains record information such as at least a group 103 or at least an object 102.

In an embodiment, the classification module 30 of the processing unit 3 receives various multimedia messages such as audio, photos and/or video from an internal storage unit (not shown) of the terminal device or from an external device such as another terminal device or a network via the data transmission interface 2 and classifies the various multimedia messages into the record information of at least an object 102 or at least a group 103 according to time, date, file format, position or a combination thereof. The object 102 is various multimedia messages (such as audio, photos and/or video) and the group 103 has at least an object 102.

In an embodiment, the calendar database 33 is an electronic calendar having a plurality of fields, and each of the fields is used for accessing record information. The classification module 30 classifies various multimedia messages such as audio, photos and/or video received by the data transmission interface 2 into the record information. The record information is at least an object 102 or at least a group 103, at least an object 102 is various multimedia messages (such as audio, photos and/or video) and at least a group 103 has at least an object 102.

In another embodiment, the storage module 31 of the processing unit 3 stores the record information generated by the classification module 30 into any one of the fields of the electronic calendar of the calendar database 33 of the processing unit 3. Further, the dynamic state setting module 32 of the processing unit 3 sets a dynamic state of the field of the electronic calendar so as to cause the electronic calendar to become an electronic dynamic calendar 100. Alternatively, the dynamic state setting module 32 sets the record information in the field of the electronic calendar of the calendar database 33 as a dynamic state of a thumbnail 101a or text 101b so as to cause the electronic calendar to become an electronic dynamic calendar 100, 100a. The display module 34 of the processing unit 3 outputs the electronic dynamic calendar 100, 100a to the screen of the display 4 of the terminal device, thereby displaying the dynamic state of the field of the electronic dynamic calendar 100, 100a on the screen of the display 4.

In an embodiment, when the dynamic state setting module 32 sets a dynamic state of the field to be the text 101b, it allows the user to set the content of the text 101b through the dynamic state setting module 32.

In an embodiment, the calendar database 33 opens access to edit the record information (i.e., at least an object 102 or at least a group 103) of the electronic dynamic calendar 100, 100a so as to allow the user to edit the record information of the electronic dynamic calendar 100, 100a through the display 4 of the terminal device and the display module 34.

In an embodiment, the classification module 30 classifies various multimedia messages such as audio, photos and/or video from the data transmission interface 2 into the record information according to time, date, file format, position or a combination thereof. The position is an address or is geographic latitude and longitude. The audio format can be MP3, AAC, Ogg Vorbi, Opus, WAV, FLAC, APE, ALAC, WavPack (WV) or the like. The photo format can be GIF, JPEG, PNG, BMP, PDF or the like. The video format can be AVI, MPEG, MP4, RM, RMVB or the like.

In an embodiment, according to time, date or a combination of time and date of record information of the object 102 or group 103, the storage module 31 stores the record information into a field of the electronic calendar of the calendar database 33 having the same time, date or a combination thereof.

In an embodiment, the display module 34 allows the user to manually drag and move the dynamic state of a field of the electronic dynamic calendar 100, 100a displayed on the screen of the display 4 to any one of the fields of the electronic dynamic calendar 100, 100a displayed on the screen.

In an embodiment, after the dynamic state of a field on the screen of the display 4 is clicked, the display module 34 further displays complete content of the record information corresponding to the clicked dynamic state of the field on the screen of the display 4.

In an embodiment, the login module 35 of the processing unit 3 is used to create an account of the electronic dynamic calendar 100, 100a, login to the electronic dynamic calendar system with an existing account of the electronic dynamic calendar 100, 100a, or login to the electronic dynamic calendar system 1 with a social account.

In an embodiment, after the login module 35 of the processing unit 3 logins to the electronic dynamic calendar system 1 with the social account, the login module 35 synchronizes the social account such that various multimedia messages such as audio, photos and/or video of the social account are automatically imported through the data transmission interface 2 to the classification module 30 so as to be classified and further stored by the storage module 31 in any one of the fields of the electronic calendar of the calendar database 33, thus allowing the dynamic state setting module 32 to generate the electronic dynamic calendar 100, 100a.

In an embodiment, the search module 37 of the processing unit 3 allows the user to search for the record information in any one of the fields of the electronic dynamic calendar 100, 100a or the dynamic state of the field according to a keyword, time, date, file format, position or a combination thereof.

In an embodiment, the reminder module 38 of the processing unit 3 allows the user to set a reminder of the dynamic state of any one of the fields of the electronic dynamic calendar 100, 100a according to time, date or a combination thereof. Further, the reminder module 38 allows the user to set a reminder of the dynamic state of any one of the fields of the electronic dynamic calendar 100, 100a according to time, date or position (e.g., geographic latitude and longitude). Therefore, when the user arrives at an actual location corresponding to the set position at the set time or date, the reminder module 38 pops up a notification on the screen of the display 4 through the display module 34 so as to remind the user.

In an embodiment, the multimedia module 36 of the processing unit 3 is used to obtain various multimedia messages such as audio, photos and/or video through a terminal device having an audio recording or photo or video capturing function. The various multimedia messages obtained by the multimedia module 36 are further automatically imported to the classification module 30 through the data transmission interface 2 and classified by the classification module 30 into the record information.

Figure 4:
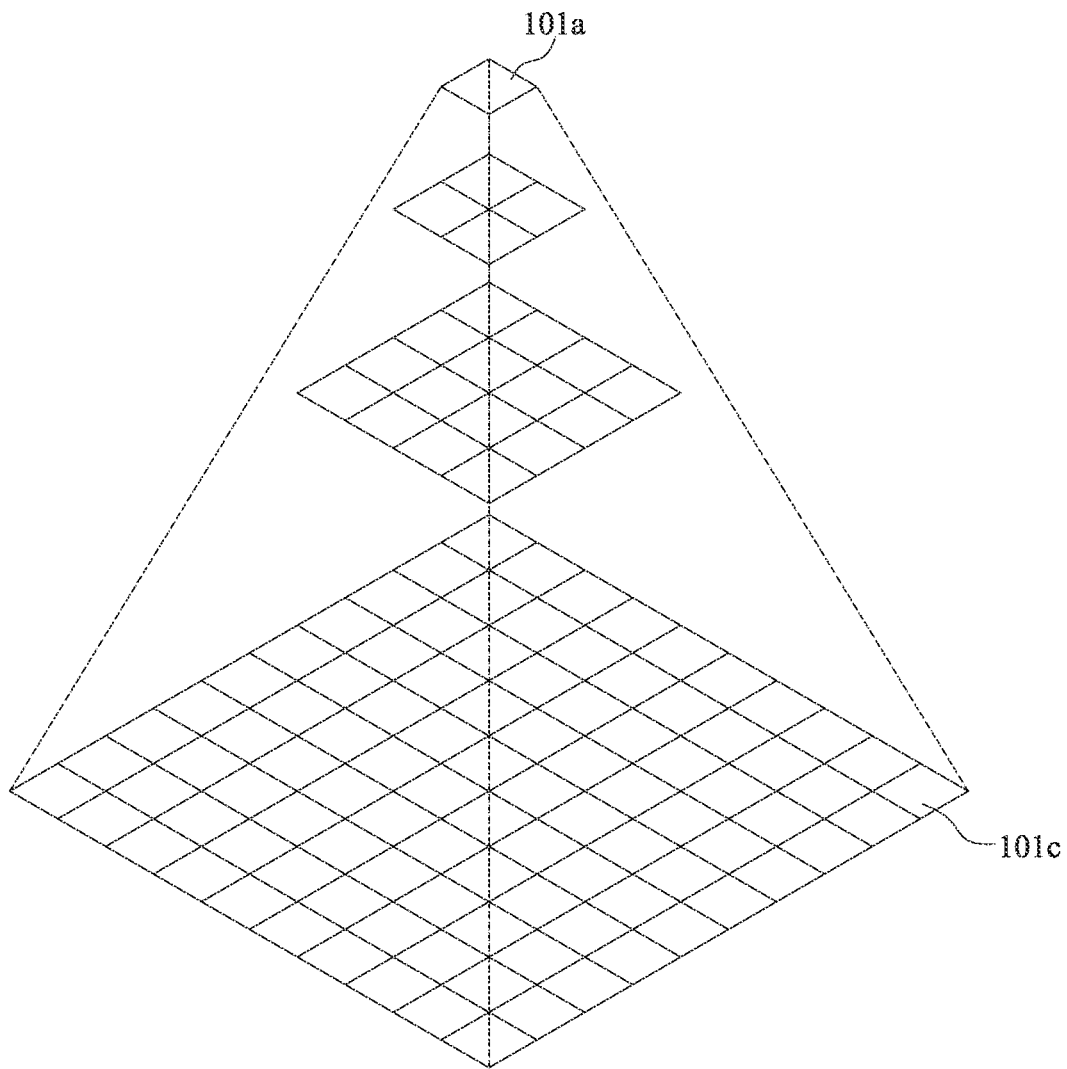
FIG. 4 is a schematic diagram of a thumbnailing method according to the present disclosure.

FIG. 4 is a schematic diagram of a thumbnailing method according to the present disclosure. As shown in FIG. 4, when the dynamic state setting module 32 sets a dynamic state of the field to be the thumbnail 101a, redundant pixels in rows and columns of a picture 101c formed from a first image of a video or a photo or a combination thereof are removed to form the thumbnail 101a, thereby reducing the total number of pixels of the picture 101c. However, directly reducing pixels may lead to a poor quality of the thumbnail 101a. Therefore, before thumbnailing, a Gaussian filter is applied to the picture 101c to maintain the quality of the picture 101c. As such, after the picture 101c is scale filtered by the Gaussian filter, pixels in even rows and columns are removed and each time the size of the picture is reduced by ¼. The two processes are repeated until the picture is reduced to the required size.

Figure 5:
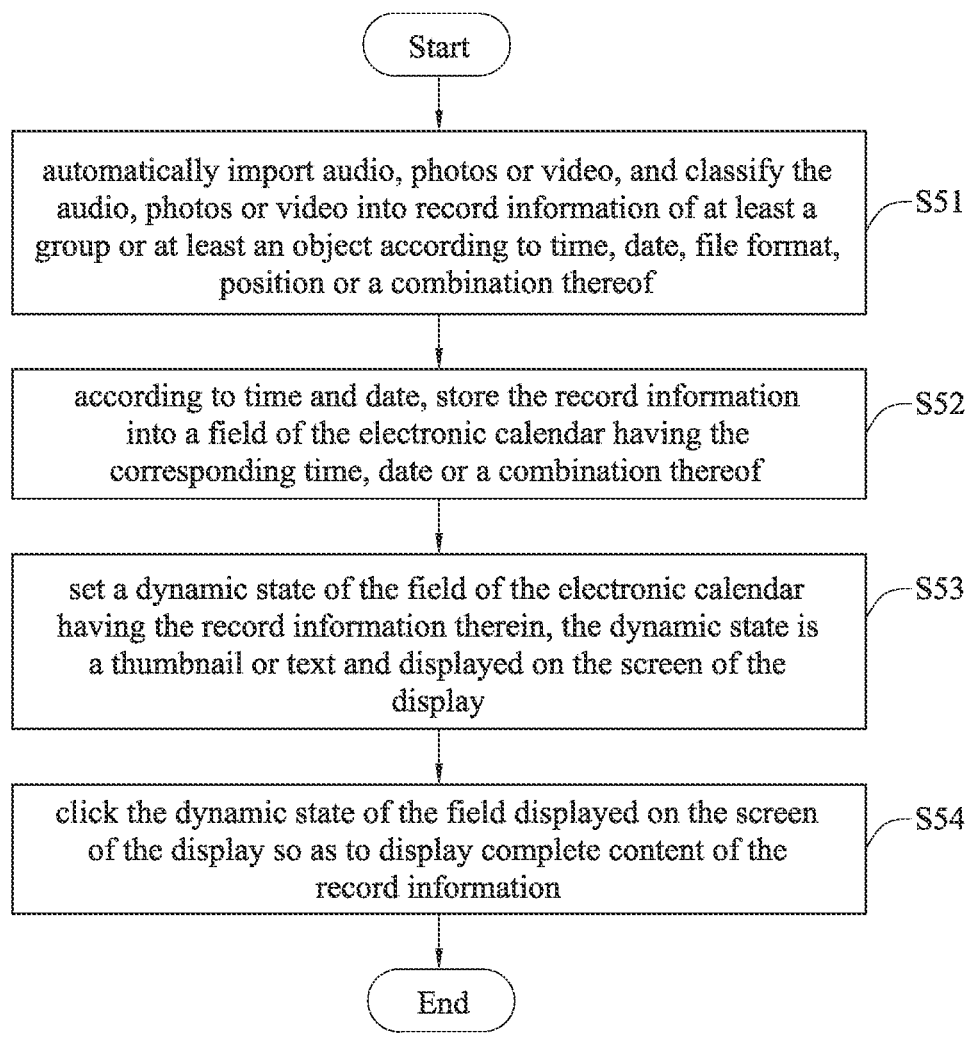
FIG. 5 is a flow diagram illustrating an electronic dynamic calendar operation method according to the first embodiment of the present disclosure.

FIG. 5 is a flow diagram illustrating an electronic dynamic calendar operation method according to the first embodiment of the present disclosure. The electronic dynamic calendar operation method according to the first embodiment is described below, and the contents that are the same as FIGS. 1, 2, 3A and 3B will not be repeated.

In an embodiment, the operation method of the electronic dynamic calendar 100 comprises: the calendar database 33 providing an electronic calendar having a plurality of fields, wherein each of the fields is used for accessing record information; the classification module 30 classifying various multimedia messages such as audio, photos and/or videos received by the data transmission interface 2 into the record information, wherein the record information is at least an object 102 or at least a group 103, the at least an object 102 is various multimedia messages (such as audio, photos and/or videos) and the at least a group 103 has the at least an object 102; the storage module 31 storing the record information generated by the classification module 30 into any one of the fields of the electronic calendar; the dynamic state setting module 32 setting a dynamic state of the field of the electronic calendar having the record information stored therein so as to cause the electronic calendar to become an electronic dynamic calendar 100, wherein the dynamic state of the field is a thumbnail 101a or text 101b; and the display module 34 outputting the electronic dynamic calendar 100 to the screen of the display 4, thereby displaying the dynamic state of the field of the electronic dynamic calendar 100 on the screen of the display 4. Referring to FIG. 5, the operation method of the electronic calendar at least comprises the following steps S51 to S54.

At step S51, the data transmission interface 2 of the processing unit 3 automatically imports various multimedia messages such as audio, photos and/or video into the classification module 30 of the processing unit 3, and the classification module 30 classifies the various multimedia messages into record information (i.e., at least a group 103 or at least an object 102) according to time, date, file format, position or a combination thereof.

In an embodiment, the position is an address or is latitude and longitude. The audio format can be MP3, AAC, Ogg Vorbi, Opus, WAV, FLAC, APE, ALAC, WavPack (WV) or the like. The photo format can be GIF, JPEG, PNG, BMP, PDF or the like. The video format can be AVI, MPEG, MP4, RM, RMVB or the like.

At step S52, according to time, date or a combination of time and date of the record information classified by the classification module 30, the storage module 31 of the processing unit 3 stores the record information into a field of the electronic calendar having the corresponding time, date or a combination thereof.

At step S53, the dynamic state setting module 32 of the processing unit 3 sets a dynamic state of the field of the electronic calendar having the record information (i.e., at least an object 102 or at least a group 103) stored therein so as to cause the electronic calendar to become an electronic dynamic calendar 100, 100a. The dynamic state of the field is a thumbnail 101a or text 101b and is displayed on the screen of the display 4.

At step S54, the display module 34 of the processing unit 3 allows the user to click the dynamic state of the field displayed on the screen of the display 4 so as to display complete content of the record information.

Figure 6:
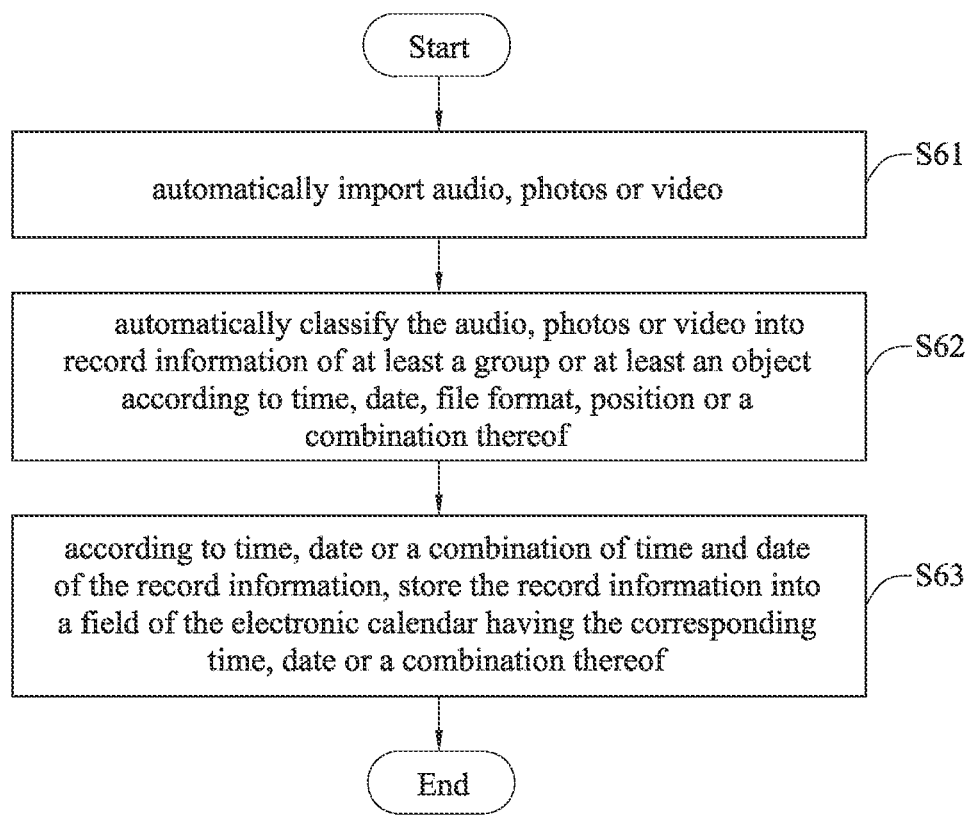
FIG. 6 is a flow diagram illustrating automatic classification of a classification module according to the first embodiment of the present disclosure.

FIG. 6 is a flow diagram illustrating an automatic classification method performed by the classification module according to the first embodiment of the present disclosure. The automatic classification method of the classification module according to the first embodiment is described below, and the contents that are the same as FIGS. 1, 2, 3A and 3B will not be repeated.

Referring to FIG. 6, the automatic classification method at least comprises the following steps S61 to S63.

At step S61, the data transmission interface 2 or multimedia module 36 automatically imports various multimedia messages such as audio, photos and/or video to the classification module 30.

At step S62, the classification module 30 classifies the multimedia messages such as audio, photos and/or video into record information of at least a group 103 or at least an object 102 according to time, date, file format, position or a combination thereof.

At step S63, according to time, date or a combination of time and date of the record information, the storage module 31 stores the record information into a field of the electronic calendar having the corresponding time, date or a combination thereof.

Figure 7:
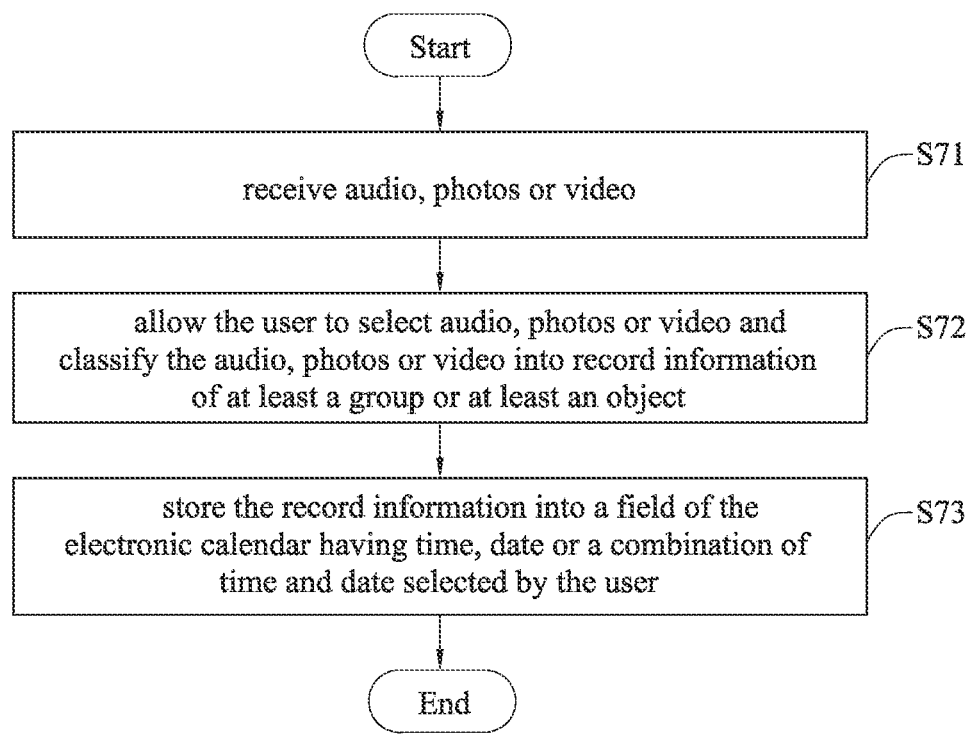
FIG. 7 is a flow diagram illustrating manual classification of the classification module according to the first embodiment of the present disclosure.

FIG. 7 is a flow diagram illustrating a manual classification method performed by the classification module according to the first embodiment of the present disclosure. The manual classification method of the classification module according to the first embodiment is described below, and the contents that are the same as FIGS. 1, 2, 3A and 3B will not be repeated.

Referring to FIG. 7, the manual classification method at least comprises the following steps S71 to S73.

At step S71, the classification module 30 receives various multimedia messages such as audio, photos and/or video.

At step S72, the processing unit 3 generates a user interface and the display module 34 displays the user interface on the screen of the display 4 so as to allow the user to select various multimedia messages such as audio, photos and/or video in the classification module 30 through the user interface and classify the multimedia messages into record information of at least a group 103 or at least an object 102.

At step S73, the user interface of the processing unit 3 allows the user to store the record information into a field of the electronic calendar having time, date or a combination of time and date selected by the user in the storage module 31.

Figure 8:
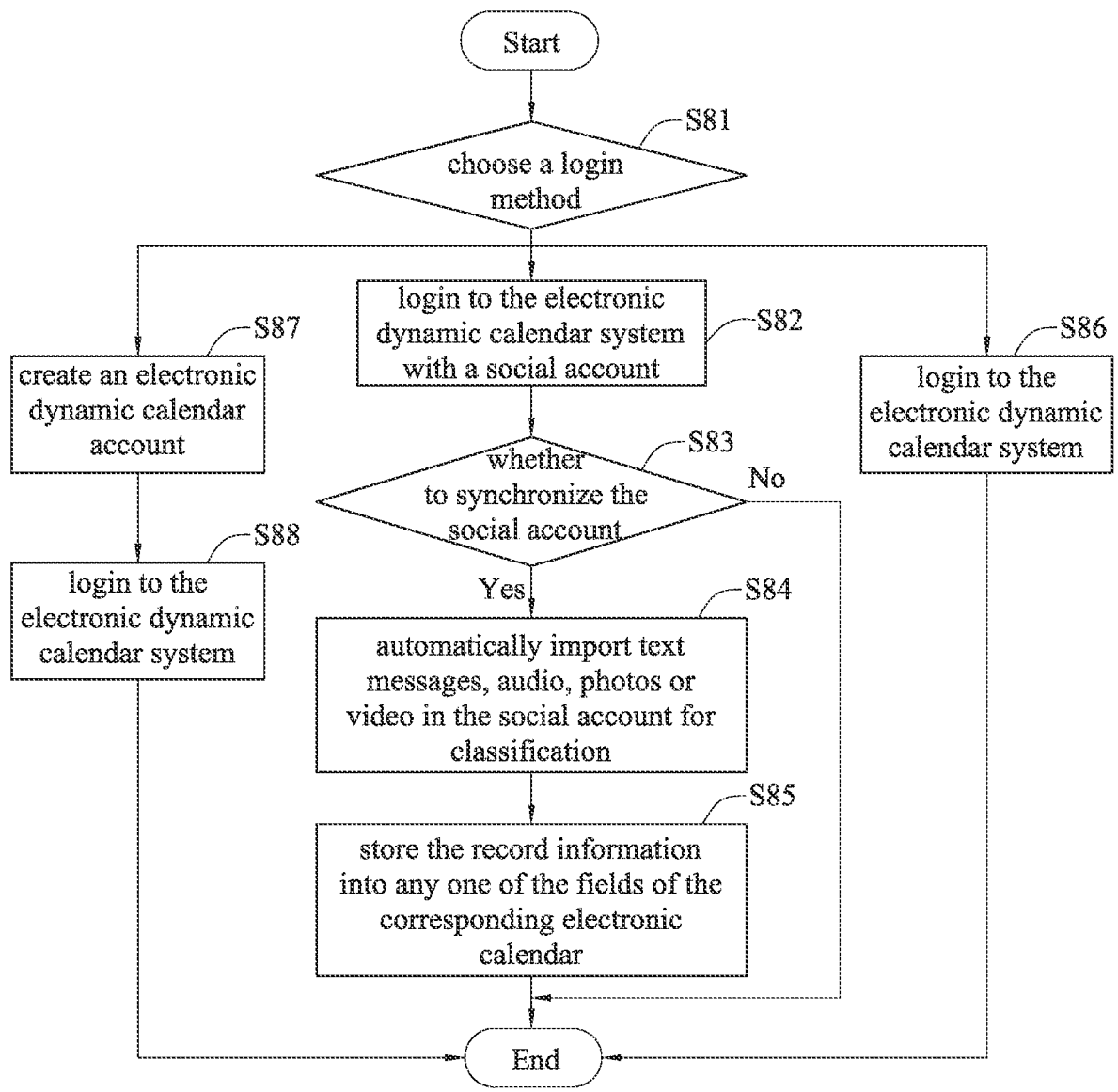
FIG. 8 is a flow diagram illustrating a login method of a login module according to the first embodiment of the present disclosure.

FIG. 8 is a schematic flow diagram illustrating a login method performed by the login module according to the first embodiment of the present disclosure. The login method of the login module according to the first embodiment is described below, and the contents that are the same as FIGS. 1, 2, 3A and 3B will not be repeated.

Referring to FIG. 8, the login method at least comprises the following steps S81 to S88.

At step S81, the login module 35 allows the user to choose a login method for logging in to the electronic dynamic calendar system 1 creating an account of an electronic dynamic calendar 100, 100a, logging in to the electronic dynamic calendar system with an existing account of the electronic dynamic calendar 100, 100a, or logging in to the electronic dynamic calendar system with a social account).

At step S82, the login module 35 allows the user to choose to login to the electronic dynamic calendar system 1 with the social account.

At step S83, the login module 35 determines whether the user synchronizes the content of the social account to the electronic calendar.

At step S84, the login module 35 determines that the user chooses to synchronize the content of the social account, and text messages, audio, photos or video in the social account are automatically imported through the data transmission interface 2 to the classification module 30 and classified by the classification module 30 into record information of at least a group 103 or at least an object 102.

At step S85, the storage module 31 stores the record information into any one of the fields of the corresponding electronic calendar of the calendar database 33.

At step S86, the login module 35 allows the user to choose to login to the electronic dynamic calendar system 1 with the existing account of the electronic dynamic calendar 100, 100a.

At step S87, the login module 35 allows the user to choose to create an account of the electronic dynamic calendar 100, 100a.

At step S88, the login module 35 allows the user to choose to login to the electronic dynamic calendar system 1 with the created account of the electronic dynamic calendar 100, 100a.

Figure 9:
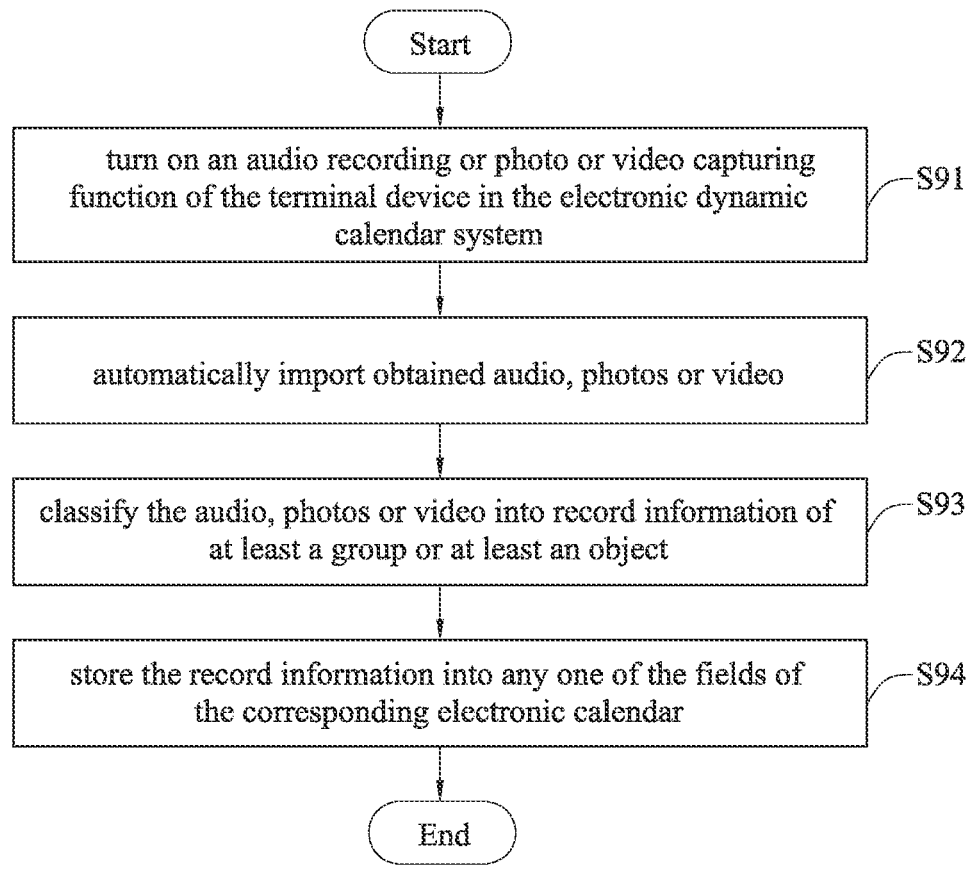
FIG. 9 is a flow diagram illustrating a multimedia importing method of a multimedia module according to the first embodiment of the present disclosure.

FIG. 9 is a flow diagram illustrating a multimedia importing method performed by the multimedia module according to the first embodiment of the present disclosure. The multimedia importing method of the multimedia module according to the first embodiment is described below, and the contents that are the same as FIGS. 1, 2, 3A and 3B will not be repeated.

Referring to FIG. 9, the importing method at least comprises the following steps S91 to S94.

At step S91, the electronic dynamic calendar system 1 allows the user to turn on an audio recording or photo or video capturing function of the terminal device through the multimedia module 36. Therein, the electronic dynamic calendar system 1 is built in the terminal device.

At step S92, the multimedia module 36 automatically imports various multimedia messages such as audio, photos and/or video obtained through the audio recording or photo or video capturing function of the terminal device to the classification module 30.

At step S93, the classification module 30 classifies the multimedia messages such as audio, photos and/or video into record information of at least a group 103 or at least an object 102.

At step S94, the storage module 31 stores the record information into any one of the fields of the corresponding electronic calendar of the calendar database 33.

Figure 10:
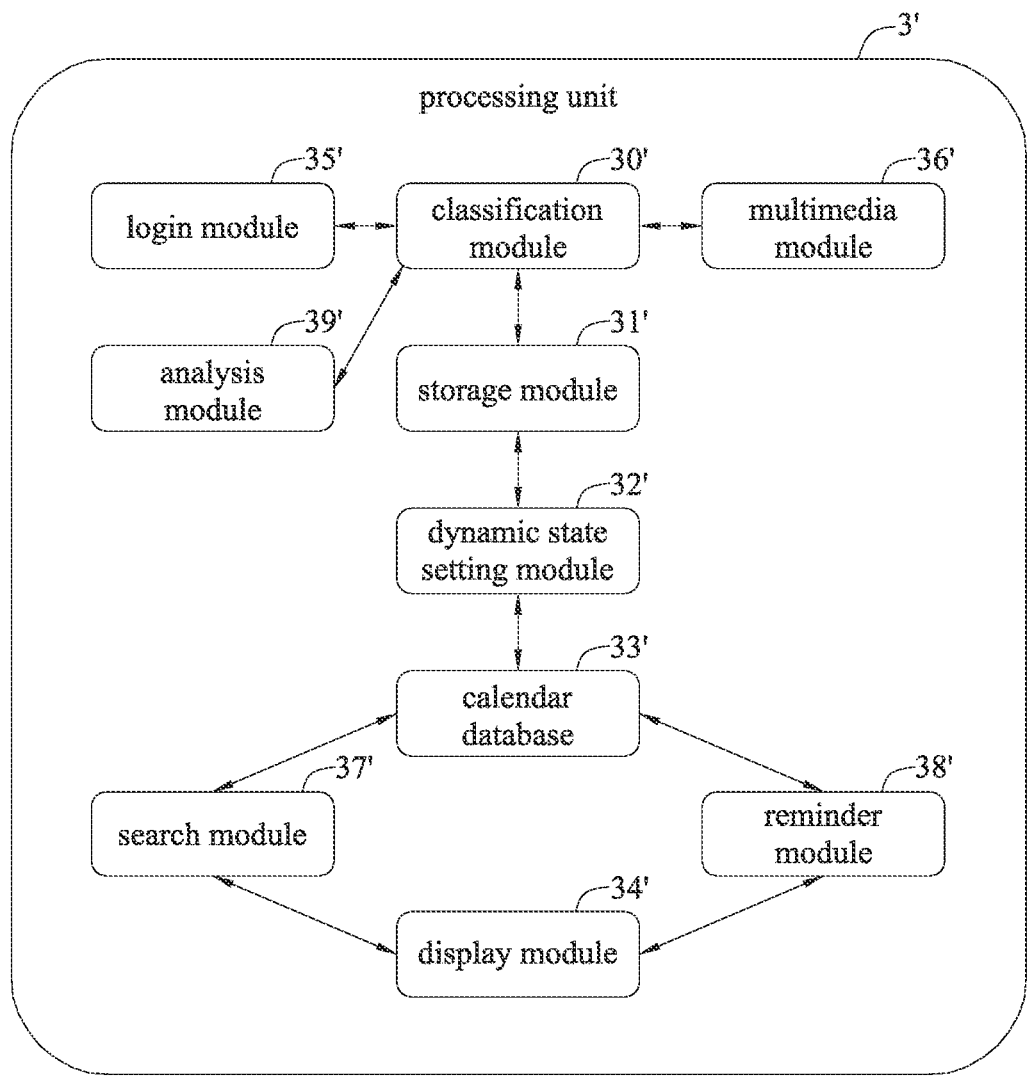
FIG. 10 is a schematic architecture diagram of an electronic dynamic calendar system according to a second embodiment of the present disclosure.

FIG. 10 is a schematic architecture diagram of an electronic dynamic calendar system according to a second embodiment of the present disclosure. Please refer to FIG. 10 in conjunction with FIGS. 1, 2, 3A and 3B. Moreover, the contents of the second embodiment that are the same as the first embodiment will not be repeated. Further, similar to the first embodiment, the second embodiment can be implemented as a method of electronic dynamic calendar operation.

In an embodiment, a processing unit 3' of the electronic dynamic calendar system 1 of a terminal device generates a user interface that allows the user to create a plurality of electronic calendars in a calendar database 33'. Further, a classification module 30' classifies various multimedia messages such as text, audio, photos and/or video received from a data transmission interface 2 or a multimedia module 36' into record information of at least an object 102, at least a text or at least a group 103 according to time, date, file format, position or a combination thereof. Then, according to time, date, position or a combination thereof, a storage module 31' stores the record information into a field of one of the plurality of electronic calendars of the calendar database 33' having corresponding date, time or a combination thereof. Alternatively, the storage module 31' allows the user to choose to store the record information into one of the plurality of electronic calendars of the calendar database 33 and the dynamic state setting module 32' causes said one of the plurality of electronic calendars to become an electronic dynamic calendar 100, 100a.

For example, the user uses the user interface generated by the processing unit 3' of the electronic dynamic calendar system 1 in the terminal device (e.g., smart phone) to create a plurality of electronic calendars of various types (e.g., work, life, activity, etc.) in the calendar database 33'. As such, during work, if the user uses a terminal device (e.g., smart phone) to capture a product photo or record meeting voice, the multimedia module 36' automatically imports the multimedia message of the captured product photo or recorded meeting voice into the classification module 30'. Then, the classification module 30' classifies the multimedia message into record information of at least an object 102, at least a text or at least a group 103 according to time, date, file format, position or a combination thereof. For example, the classification module 30' classifies the photo or voice into record information of a group according to the user's working hours (i.e., time, date) and company location (i.e., position). Thereafter, the storage module 31 stores the record information (i.e., the product photo or meeting voice) into a work electronic calendar of the plurality of electronic calendars according to the user's working hours (i.e., time, date) and company location (i.e., position). Further, the dynamic state setting module 32' forms a dynamic state of a thumbnail 101a or text 101b according to the product photo or meeting voice of the record information. Therefore, the work electronic calendar becomes a work electronic dynamic calendar 100, 100a.

Further, if other users transmit the product photos or meeting voice to the terminal device of the user through a network, Bluetooth, NFC or the like, the user interface 2 automatically imports the received various multimedia messages of the product photos or meeting voice to the classification module 30'. Furthermore, the at least an object is audio, photos or video of the multimedia message. The at least a text is text of the multimedia message. The at least a group has the at least an object or at least a text.

In an embodiment, the display module 34' allows the user to copy the dynamic state of at least one field of one of a plurality of electronic dynamic calendars 100, 100a displayed on the screen of the display 4 to a plurality of fields or the same field of the other electronic dynamic calendars 100, 100a.

In an embodiment, the display module 34' allows the user to choose to share at least one of the plurality of electronic dynamic calendars 100, 100a with other users through the data transmission interface 2 by using wireless transmission technology or cloud technology. For example, the data transmission interface 2 uploads at least one of the plurality of electronic dynamic calendars 100, 100a to a cloud server (not shown) through a network, and other users can communicatively connect their terminal devices (e.g., smart phones) having the electronic dynamic calendar system 1 to the cloud server so as to obtain said at least one of the plurality of electronic dynamic calendars 100, 100a.

In an embodiment, the classification module 30' receives a web address message (e.g., uniform resource identifier [URI]) from the data transmission interface 2. Therein, the classification module 30' receives and analyzes the web address message to determine the property of the web address message, and the storage module 31' stores the web address message into a corresponding one of the plurality of electronic dynamic calendars 100, 100a according to the property of the web address message.

For example, after receiving a web address message from the data transmission interface 2, the classification module 30' analyzes the web address message and determines that the property of the web address message is a video website address (e.g., www.youtube.com). As such, the storage module 31' stores the web address message into an electronic dynamic calendar 100, 100a used for storing video website addresses according to time and date set by the user.

In an embodiment, an analysis module 39' receives a text message from the data transmission interface 2, applies a word segmentation algorithm (e.g., Jieba algorithm) to the text message so as to obtain a plurality of segmented words, and applies a neural network analysis model to the plurality of segmented words so as to obtain time or date related content and purpose related content. The classification module 30' receives the time or date related content and purpose related content and classifies the purpose related content into record information of text. Further, the storage module 31' stores the record information into the corresponding field of the electronic calendar of the calendar database 33' according to the time or date related content, and the dynamic state setting module 32' forms a dynamic state of text 101b according to the purpose related content of the record information so as to cause the electronic calendar to become an electronic dynamic calendar 100, 100a.

For example, when the user uses communication software (e.g., Line or Messenger) to communicate with other people, the user clicks a text message on the user's terminal device (e.g., smart phone) such as "Would you like to eat dinner together at 7:00 this evening?" and the text message is automatically imported to the analysis module 39' through the data transmission interface 2. Then, the analysis module 39' applies a word segmentation algorithm (e.g., Jieba algorithm) to the text message so as to obtain a plurality of segmented words such as "today," "evening," "7:00," "together," "eat," "dinner" and "Would." Thereafter, the analysis module 39' applies a neural network analysis model to the plurality of segmented words so as to obtain date or time related content "7:00 this evening" and purpose related content "eat dinner." Thereafter, the classification module 30' receives the contents and classifies the purpose related content "eat dinner" into record information of text. Then, the storage module 31' stores the record information into the corresponding field of the electronic calendar of the calendar database 33' according to the date or time related content "7:00 this evening." Finally, the dynamic state setting module 32' forms a dynamic state of text 101b according to the purpose related content "eat dinner" of the record information. As such, the electronic calendar becomes an electronic dynamic calendar 100, 100a (e.g., life electronic dynamic calendar). It should be understood that "today" in the text message refers to the date of the user's conversation by default in the storage module 31'.

Further, the user interface allows the user to modify the date or time related content and the purpose related content in the storage module 31'.

In an embodiment, the multimedia module 36' monitors or filters a multimedia message of voice during the user's call, and when the user mentions a plurality of times or dates during the call, the multimedia module 36' records a plurality of text messages with the times or dates. As such, after the call, the multimedia module 36' displays the plurality of text messages through the display module 34' on the screen of the display 4 for the user to select, the multimedia module 36' automatically imports the selected one of the plurality of text messages to the analysis module 39', and the analysis module 39' generates date or time related content and purpose related content for the selected one of the plurality of text messages.

For example, when the user uses the terminal device (e.g., smart phone) to communicate with other people, the multimedia module 36' monitors or filters a multimedia message of voice during the call, and optionally stores the multimedia message in an internal storage unit (not shown) of the terminal device temporarily. When the user mentions a plurality of times or dates during the call, the multimedia module 36' records a plurality of text messages with the times or dates. For example, "We have dinner on December 7th" and "or on December $8^{th}$." As such, after the call, the display module 34' displays "We have dinner on December 7th" and "or on December 8th" on the screen of the display 4 so as for the user to select. When the user selects "We have dinner on December $7^{th}$," the multimedia module 36' automatically imports the text message of "We have dinner on December 7th" to the analysis module 39'. The analysis module 39' uses a word segmentation algorithm (e.g., Jieba algorithm) and a neural network analysis model to obtain date or time related content "December 7th" and purpose related content "have dinner."

Thereafter, the classification module 30' receives the contents and classifies the purpose related content "have dinner" into record information of text, and the storage module 31' stores the record information into the corresponding field of the electronic calendar of the calendar database 33' according to the date or time related content "December 7$^{th}$." Finally, the dynamic state setting module 32' forms a field with dynamic state of text 101*b* from the purpose related content "have dinner" of the record information. As such, the electronic calendar becomes an electronic dynamic calendar 100, 100*a* (e.g., life electronic dynamic calendar). It should be understood that if the user only mentions "17$^{th}$," it refers to 17th of the current month by default in the storage module 31'; and if the user does not specify the date and only mentions "today, tomorrow, yesterday," the actual dates of "today, tomorrow, yesterday" will be inferred by the storage module 31' based on the current day.

In an embodiment, the analysis module 39' trains the neural network analysis model based on the text messages in each analysis by using big data and deep learning technologies (e.g., a deep neural network, a convolutional neural network, a deep belief network or a recurrent neural network). As such, when analyzing text messages next time, the analysis module 39' can obtain more accurate time or date related content and purpose related content so as to prevent inaccurate time or date related content and purpose related content and avoid inconvenience to the user.

The present disclosure further provides a computer readable storage medium applicable in a computer or computing device having a processor and/or memory. The computer readable storage medium stores instructions, which are executed by the computer or computing device through the processor (e.g., central processing unit [CPU], graphics processing unit [GPU], etc.) and/or memory so as to perform the above-described operation method or system of an electronic dynamic calendar.

Therefore, the electronic dynamic calendar system and the operation method thereof according to the present disclosure have the following features, advantages or technical effects.

1. In addition to text messages, the electronic dynamic calendar of the present disclosure can record audio, photos or video in a field of the electronic calendar having the corresponding time, date or a combination thereof, thus making it easier for the user to record events.

2. The electronic dynamic calendar of the present disclosure provides various methods for importing audio, photos or video, including audio, photos or video already stored in terminal devices such as mobile phones, tablets and personal computers or social software or recorded or captured audio, photos or video, thus making it more convenient for the user to import audio, photos or video.

3. The electronic dynamic calendar of the present disclosure allows audio, photos or video to be automatically classified or manually classified by the user according to the user's preference, so it is more convenient to classify.

4. The electronic dynamic calendar of the present disclosure can set a reminder of the dynamic state of a field of at least an object containing audio, photos or video or at least a group having the object. When the reminder pops up on the screen of a terminal device such as a mobile phone, a tablet or a personal computer, the user can more intuitively and clearly understand the following schedule through the audio, photos or video.

5. The electronic dynamic calendar of the present disclosure can share at least an object containing audio, photos or video or at least a group having the object to other users, which not only serves as a reminder, but also facilitates interaction or connection between the users.

6. Compared with the conventional electronic calendar that merely uses different colors to distinguish events of certain time or date and thus complicates the electronic calendar and confuses the user (the user cannot clearly view the conventional electronic calendar), the present disclosure allows the user to create electronic dynamic calendars of different types according to different requirements (such as for life, work and activity purposes). As such, the user can clearly identify various events on the electronic dynamic calendars of different types. Further, certain electronic dynamic calendars can be shared to certain people.

7. Based on user mentioned text or voice messages, the present disclosure can automatically add user mentioned to-do events (e.g., eat dinner, make an appointment, etc.) into an electronic dynamic calendar according to user mentioned time or date. Therefore, the user does not need to open the electronic dynamic calendar and input the to-do events. Hence, the present disclosure can quickly and conveniently add to-do events into the electronic dynamic calendar.

The above-described descriptions of the detailed embodiments are to illustrate the preferred implementation according to the present disclosure, and it is not to limit the scope of the present disclosure. Accordingly, all modifications and variations completed by those with ordinary skill in the art should fall within the scope of present disclosure defined by the appended claims.

What is claimed is:

1. A method of electronic dynamic calendar operation, comprising:

providing, by a calendar database, an electronic calendar having a plurality of fields, wherein each of the fields is used for accessing record information;

classifying, by a classification module, a video message received by a data transmission interface into the record information, wherein the record information is at least one object or at least one group, and wherein the at least one object is the video message and the at least one group has the at least one object;

receiving, by an analysis module, a text message in the video message received by the data transmission interface, and applying a word segmentation algorithm to the text message to obtain a plurality of segmented words, and applying a neural network analysis model to the plurality of segmented words to obtain time or date related content and purpose related content to be included in the record information;

storing, by a storage module, the record information generated by the classification module and obtained by the analysis module into any one of the fields of the electronic calendar;

setting, by a dynamic state setting module, a dynamic state of the field of the electronic calendar having the record information stored therein to cause the electronic calendar to become an electronic dynamic calendar, wherein the dynamic state of the field is a thumbnail; and outputting, by a display module, the electronic dynamic calendar to a screen of a display, thereby displaying the dynamic state of the field of the electronic dynamic calendar on the screen of the display.

2. The method of claim 1, further comprising classifying, by the classification module, the multimedia message into the record information according to time, date, file format, position or a combination thereof, wherein the position is an address or is latitude and longitude.

3. The method of claim 1, further comprising, according to time, date or a combination of time and date of the record information, storing, by the storage module, the record information into a field of the electronic calendar having the same time, date or a combination thereof.

4. The method of claim 1, further comprising creating, by a login module, an electronic dynamic calendar account, and logging in to the electronic dynamic calendar system with an existing electronic dynamic calendar account or logging in to the electronic dynamic calendar system with a social account.

5. The method of claim 4, further comprising, after the login module logins in to the electronic dynamic calendar system with the social account, synchronizing, by the login module, the social account, such that the multimedia message of the social account is transmitted or imported through the data transmission interface to the classification module for classification and stored by the storage module into any one of the fields of the electronic calendar of the calendar database.

6. The method of claim 1, further comprising:
searching for the record information by a search module in any one of the fields of the electronic dynamic calendar or the dynamic state of the field by using a keyword, time, date, file format, position or a combination thereof;
setting, by a reminder module, a reminder of the dynamic state of any one of the fields of the electronic dynamic calendar according to time, date or a combination thereof; and
obtaining, by a multimedia module, the multimedia message through audio recording or photo or video capturing.

7. An electronic dynamic calendar system built in a terminal device, comprising:
a display having a screen;
a data transmission interface for receiving a first video message; and
a processing unit, comprising:
  a calendar database allowing to create a plurality of electronic calendars each having a plurality of fields, wherein each of the fields is used for accessing record information;
  a multimedia module for receiving a second video message obtained by the terminal device;
  a classification module for receiving the first video message or the second video message imported from the data transmission interface or the multimedia module and classifying the first or second video message into the record information, wherein the record information is at least one object, at least one text, or at least one group;
  an analysis module for receiving a text message in the first video message or the second video message from the data transmission interface or the multimedia module, applying a word segmentation algorithm to the text message to obtain a plurality of segmented words, and applying a neural network analysis model to the plurality of segmented words to obtain time or date related content and purpose related content to be included in the record information;
  a storage module for receiving the record information generated by the classification module and obtained by the analysis module and storing the record information into at least one field of one of the plurality of electronic calendars;
  a dynamic state setting module for setting a dynamic state of the field of the electronic calendar having the record information stored therein to cause the electronic calendar to become an electronic dynamic calendar, wherein the dynamic state of the field is a thumbnail; and
  a display module for outputting the electronic dynamic calendar to the screen of the display, thereby displaying the dynamic state of the field of the electronic dynamic calendar on the screen of the display.

8. The electronic dynamic calendar system of claim 7, wherein the display module allows to copy the dynamic state of at least one field of one of a plurality of electronic dynamic calendars displayed on the screen of the display to at least one field of the other electronic dynamic calendars.

9. The electronic dynamic calendar system of claim 7, wherein the classification module receives a web address message from the data transmission interface and analyzes the web address message to determine a property of the web address message, thereby allowing the storage module to store the web address message into corresponding one of the plurality of electronic calendars according to the property of the web address message.

10. The electronic dynamic calendar system of claim 7, wherein the display module allows to select at least one of a plurality of electronic dynamic calendars, and the data transmission interface shares at least one of the plurality of electronic dynamic calendars.

11. The electronic dynamic calendar system of claim 7, wherein the multimedia module monitors or filters a video or multimedia message of voice during a call and records a plurality of text messages with time or date, the display module displays the plurality of text messages on the screen of the display for selection, the multimedia module imports the selected one of the plurality of text messages to the analysis module, and the analysis module generates date or time related content and purpose related content for the selected one of the plurality of text messages.

12. The electronic dynamic calendar system of claim 7, wherein the classification module receives the date or time related content and the purpose related content from the analysis module to classify the purpose related content into record information of text.

13. The electronic dynamic calendar system of claim 12, wherein the storage module stores the record information into a corresponding field of an electronic calendar of the calendar database according to the date or time related content, and the dynamic state setting module forms a dynamic state of text according to the purpose related content of the record information, thereby causing the electronic calendar to become the electronic dynamic calendar.

\* \* \* \* \*